US010390028B2

(12) United States Patent
Sun et al.

(10) Patent No.: US 10,390,028 B2
(45) Date of Patent: Aug. 20, 2019

(54) METHODS FOR PALETTE CODING OF IMAGE AND VIDEO DATA

(71) Applicant: MEDIATEK INC., Hsinchu (TW)

(72) Inventors: Yu-Chen Sun, Keelung (TW); Tzu-Der Chuang, Zhubei (TW); Han-Liang Chou, Hsinchu County (TW); Chia-Yun Cheng, Zhubei (TW); Ching-Yeh Chen, Taipei (TW); Yu-Wen Huang, Taipei (TW)

(73) Assignee: MEDIATEK INC., Hsinchu (TW)

( * ) Notice: Subject to any disclaimer, the term of this patent is extended or adjusted under 35 U.S.C. 154(b) by 0 days.

(21) Appl. No.: 15/578,221

(22) PCT Filed: Jun. 3, 2016

(86) PCT No.: PCT/CN2016/084784
§ 371 (c)(1),
(2) Date: Nov. 29, 2017

(87) PCT Pub. No.: WO2016/192678
PCT Pub. Date: Dec. 8, 2016

(65) Prior Publication Data
US 2018/0152714 A1 May 31, 2018

Related U.S. Application Data

(60) Provisional application No. 62/170,267, filed on Jun. 3, 2015, provisional application No. 62/213,254, filed on Sep. 2, 2015.

(51) Int. Cl.
*H04N 19/00* (2014.01)
*H04N 19/186* (2014.01)
(Continued)

(52) U.S. Cl.
CPC ......... *H04N 19/186* (2014.11); *H04N 19/176* (2014.11); *H04N 19/423* (2014.11);
(Continued)

(58) Field of Classification Search
CPC ................................................ H04N 19/00–99
See application file for complete search history.

(56) References Cited

U.S. PATENT DOCUMENTS 5,793,883 A * 8/1998 Kim .................... G06T 7/0012
382/128
6,037,982 A 3/2000 Coelho
(Continued)

OTHER PUBLICATIONS

International Search Report dated Aug. 26, 2016, issued in application No. PCT/CN2016/084784.
(Continued)

*Primary Examiner* — Sean T Motsinger
(74) *Attorney, Agent, or Firm* — Oblon, McClelland, Maier & Neustadt, L.L.P.

(57) ABSTRACT

Methods of palette coding to reduce the required coding process are disclosed. According to one method, smaller blocks are derived from a large block. The histogram of the large block is derived based on the histograms of smaller blocks in the large block. According to another method, one or more palette tables are derived based on multiple blocks. One palette table is used for each of the multiple blocks. According to yet another method, index map transpose is performed in the parsing stage according to the transpose flag of the index map. Accordingly, a buffer to store the transpose flags can be saved. According to still yet another method, the palette predictor update is performed using an index mapping table to avoid the need for shuffling the contents of the palette predictor stored in a palette buffer.

12 Claims, 7 Drawing Sheets

(51) Int. Cl.
*H04N 19/51* (2014.01)
*H04N 19/593* (2014.01)
*H04N 19/423* (2014.01)
*H04N 19/433* (2014.01)
*H04N 19/176* (2014.01)
*H04N 19/70* (2014.01)

(52) U.S. Cl.
CPC ............ *H04N 19/433* (2014.11); *H04N 19/51* (2014.11); *H04N 19/593* (2014.11); *H04N 19/70* (2014.11)

(56) References Cited

U.S. PATENT DOCUMENTS

| | | | | |
|---|---|---|---|---|
| 9,596,479 | B2* | 3/2017 | Liu | H04N 19/50 |
| 9,900,624 | B2* | 2/2018 | Lai | H04N 19/86 |
| 2001/0014126 | A1* | 8/2001 | Nishizawa | G06T 9/007 |
| | | | | 375/240.25 |
| 2002/0159632 | A1* | 10/2002 | Chui | G06T 9/00 |
| | | | | 382/168 |
| 2003/0117461 | A1 | 6/2003 | Park et al. | |
| 2014/0126814 | A1 | 5/2014 | Christensen et al. | |
| 2014/0301475 | A1* | 10/2014 | Guo | H04N 19/50 |
| | | | | 375/240.24 |
| 2014/0376634 | A1 | 12/2014 | Guo et al. | |
| 2015/0049813 | A1 | 2/2015 | Tabatabai et al. | |
| 2015/0071357 | A1 | 3/2015 | Pang et al. | |
| 2015/0146976 | A1* | 5/2015 | Ma | H04N 1/646 |
| | | | | 382/166 |
| 2015/0264365 | A1* | 9/2015 | Tsai | H04N 19/94 |
| | | | | 375/240.03 |
| 2015/0271505 | A1* | 9/2015 | Ma | H04N 19/27 |
| | | | | 375/240.08 |
| 2015/0281703 | A1* | 10/2015 | Zou | H04N 19/80 |
| | | | | 375/240.24 |
| 2015/0341643 | A1* | 11/2015 | Xu | H04N 19/593 |
| | | | | 375/240.02 |
| 2015/0381994 | A1* | 12/2015 | Yu | H04N 19/186 |
| | | | | 375/240.24 |
| 2016/0037164 | A1* | 2/2016 | Joshi | H04N 19/129 |
| | | | | 375/240.02 |
| 2016/0057434 | A1* | 2/2016 | Lai | H04N 19/176 |
| | | | | 382/233 |
| 2016/0100179 | A1* | 4/2016 | He | H04N 19/176 |
| | | | | 375/240.25 |
| 2016/0227239 | A1* | 8/2016 | Pu | H04N 19/593 |
| 2016/0227254 | A1* | 8/2016 | Karczewicz | H04N 19/70 |
| 2016/0255352 | A1* | 9/2016 | Pu | H04N 19/94 |
| | | | | 375/240.24 |
| 2016/0309172 | A1* | 10/2016 | Laroche | H04N 19/593 |
| 2016/0323600 | A1* | 11/2016 | Ma | H04N 19/174 |
| 2016/0345030 | A1* | 11/2016 | Karczewicz | H04N 19/176 |
| 2017/0230667 | A1* | 8/2017 | Gisquet | H04N 19/147 |
| 2017/0257630 | A1* | 9/2017 | Lai | H04N 1/644 |
| 2017/0374366 | A1* | 12/2017 | Xiu | H04N 19/129 |
| 2018/0007359 | A1* | 1/2018 | Hsiang | H04N 19/13 |
| 2018/0014034 | A1* | 1/2018 | Lai | H04N 19/86 |
| 2018/0020236 | A1* | 1/2018 | Lee | H04N 19/597 |
| 2018/0109798 | A1* | 4/2018 | Lee | H04N 19/186 |

OTHER PUBLICATIONS

The partial supplementary European search report (R. 164 EPC) dated Jan. 19, 2019 for Application No. 16802601.1-1208/3295660 PCT/CN2016084784, 10 pages.

Chao-Hsiung Hung et al.; "CE1-Related: Improved Palette Table Generation"; Joint Collaborative Team on Video Coding (JCT-VC) of ITU-T SG 16 WP3 and ISO/IEC JTC 1/SC 29/WG 11; 20th Meeting: Geneva, CH, Feb. 10-18, 2015, Document JCTVC-T0087r3, 8 pages.

Nikolay Sakharnykh; "GPU Pro Tip: Fast Histograms Using Shared Atomics on Maxwell", Mar. 17, 2015, XP002786269, retrieved from Internet URL:https://devblogs.nvdia.com/gpu-pro-tip-fast-histograms-using-shared-atomics-maxwell/ [retrieved on Nov. 6, 2018], 6 pages.

* cited by examiner

METHODS FOR PALETTE CODING OF IMAGE AND VIDEO DATA

CROSS REFERENCE TO RELATED APPLICATIONS

The present invention claims priority to U.S. Provisional Patent Application, Ser. No. 62/170,267, filed on Jun. 3, 2015 and U.S. Provisional Patent Application, Ser. No. 62/213,254, filed on Sep. 2, 2015. The U.S. Provisional patent applications are hereby incorporated by reference in their entireties.

FIELD OF THE INVENTION

The present invention relates to video coding using the palette coding mode. In particular, the present invention relates to techniques to reduce required processing associated with palette coding.

BACKGROUND AND RELATED ART

High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

Along with the High Efficiency Video Coding (HEVC) standard development, the development of extensions of HEVC has also started. The HEVC extensions include screen content coding (SCC). Due to specific characteristics of screen contents, coding tools have been developed and demonstrate significant gains in coding efficiency. Among them, the colour index coding (a.k.a. major colour based coding) techniques represent block of pixels using indices to the palette (major colours), and encode the palette and the indices by exploiting spatial redundancy. While the total number of possible colour combinations is huge, the number of colours in an area of picture is usually very limited for typical screen contents. Therefore, the colour index coding becomes very effective for screen content materials. Related key colour index coding techniques are briefly reviewed as follows.

Palette Coding

During the development of HEVC range extensions (RExt), several proposals have been disclosed to address palette-based coding. For example, a palette prediction and sharing technique is disclosed in JCTVC-N0247 (Guo et al., "*RCE3: Results of Test* 3.1 *on Palette Mode for Screen Content Coding*", Joint Collaborative Team on Video Coding (JCT-VC) of ITU-T SG 16 WP 3 and ISO/IEC JTC 1/SC 29/WG 11, 14th Meeting: Vienna, AT, 25 Jul.-2 Aug. 2013 Document: JCTVC-N0247) and JCTVC-O0218 (Guo et al., "*Evaluation of Palette Mode Coding on HM*-12.0+*RExt*-4.1", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, Document: JCTVC-O0218). In JCTVC-N0247 and JCTVC-O0218, the palette of each colour component is constructed and transmitted. The palette can be predicted (or shared) from its left neighbouring CU to reduce the bitrate. All pixels within the given block are then coded using their palette indices. An example of encoding process according to JCTVC-N0247 is shown as follows.

1. Transmission of the palette: the colour index table (also called palette table) size is first transmitted followed by the palette elements (i.e., colour values).
2. Transmission of pixel values: the pixels in the CU are encoded in a raster scan order. For each group of one or more pixels, a flag for a run-based mode is first transmitted to indicate whether the "copy index mode" or "copy above mode" is being used.
   2.1 "Copy index mode": In the copy index mode, a palette index is first signalled followed by "palette_run" (e.g., M) representing the run value. The term palette_run may also be referred as pixel_run in this disclosure. The run value indicates that a total of M samples are all coded using copy index mode. No further information needs to be transmitted for the current position and the following M positions since they have the same palette index as that signalled in the bitstream. The palette index (e.g., i) may also be shared by all three colour components, which means that the reconstructed pixel values are (Y, U, V)= (palette$_Y$[i], palette$_U$[i], palette$_V$[i]) for the case of YUV colour space.
   2.2 "Copy above mode": In the copy above mode, a value "copy_run" (e.g. N) is transmitted to indicate that for the following N positions (including the current one), the palette index is the same as the corresponding palette index in the row above.
3. Transmission of residue: the palette indices transmitted in Stage 2 are converted back to pixel values and used as the prediction. Residue information is transmitted using HEVC residual coding and is added to the prediction for the reconstruction.

Both "copy index mode" and "copy above mode" are referred as copy modes for palette index coding in this disclosure. Besides, the palette mode is also referred to as palette coding mode in the following descriptions.

In JCTVC-N0247, palette of each component are constructed and transmitted. The palette can be predicted (shared) from its left neighbouring CU to reduce the bitrate. In JCTVC-O0218, each element in the palette is a triplet, which represents a specific combination of the three colour components. Furthermore, the predictive coding of palette across CU is removed.

Major-Colour-Based (or Palette) Coding

Another palette coding technique similar to JCTVC-O0218 has also been disclosed. Instead of predicting the entire palette table from the left CU, individual palette colour entry in a palette is predicted from the exact corresponding palette colour entry in the above CU or left CU.

For transmission of pixel palette index values, a predictive coding method is applied on the indices as disclosed in JCTVC-O0182 (Guo et al., "*AHG8: Major-colour-based screen content coding*", Joint Collaborative Team on Video Coding (JCT-VC) of ITU-T SG 16 WP 3 and ISO/IEC JTC 1/SC 29/WG 11, 15th Meeting: Geneva, CH, 23 Oct.-1 Nov. 2013, Document: JCTVC-O0182). Three types of line modes, i.e., horizontal mode, vertical mode and normal mode are used for coding each index line. In the horizontal mode, all the indices in the same line have the same value. If the value is the same as the first pixel of the above pixel line, only line mode signalling bits are transmitted. Otherwise, the index value is also transmitted. In the vertical mode, it indicates that the current index line is the same with the above index line. Therefore, only line mode signalling bits are transmitted. In normal mode, indices in a line are predicted individually. For each index position, the left or above neighbours is used as a predictor, and the prediction symbol is transmitted to the decoder.

Furthermore, pixels are classified into major colour pixels (with palette indices pointing to the palette colours) and escape pixel according to JCTVC-O0182. For major colour pixels, the pixel value is reconstructed according to the major colour index (i.e., palette index) and palette table in the decoder side. For escape pixel, the pixel value is further signalled in the bitstream.

Palette Table Signalling

In the reference software of screen content coding (SCC) standard, SCM-2.0 (Joshi et al., *Screen content coding test model 2 (SCM 2)*, Joint Collaborative Team on Video Coding (JCT-VC) of ITU-T SG 16 WP 3 and ISO/IEC JTC 1/SC 29/WG 11, 18th Meeting: Sapporo, JP, July 2014, Document No.: JCTVC-R1014), an improved palette scheme is integrated in JCTVC-R0348 (Onno, et al., *Suggested combined software and text for run-based palette mode*, Joint Collaborative Team on Video Coding (JCT-VC) of ITU-T SG 16 WP 3 and ISO/IEC JTC 1/SC 29/WG 11, 18th Meeting: Sapporo, JP, July 2014, Document No.: JCTVC-R0348). The palette table of previous palette-coded CU is used as a predictor for current palette table coding. In palette table coding, the current palette table is signalled by choosing which palette colours in the previous coded palette table (palette predictor) are reused, or by transmitting new palette colours. The size of the current palette is set as the size of the predicted palette (i.e., numPredPreviousPalette) plus the size of the transmitted palette (i.e., num_signalled_palette_entries). The predicted palette is a palette derived from the previously reconstructed palette coded CUs. When coding the current CU as a palette mode, those palette colours that are not predicted using the predicted palette are directly transmitted in the bitstream (i.e., signalled entries).

An example of palette updating is shown as follows. In this example, the current CU is coded as palette mode with a palette size equal to six. Three of the six major colours are predicted from the palette predictor (numPredPreviousPalette=3) and three are directly transmitted through the bitstream. The transmitted three colours can be signalled using the exemplary syntax shown below.

num_signalled_palette_entries=3
for(cIdx=0; cIdx<3; cIdx++)//signal colours for different components
    for(i=0; i<num_signalled_palette_entries; i++)
    palette_entries[cIdx][numPredPreviousPalette+i]

Since the palette size is six in this example, the palette indices from 0 to 5 are used to indicate the major colour entries in the palette colour table. The 3 predicted palette colours are represented with indices 0 to 2. Accordingly, three new palette entries are transmitted for indexes 3 through 5.

In SCM-2.0, if the wavefront parallel processing (WPP) is not applied, the palette predictor table is initialized (reset) at the beginning of each slice or at the beginning of each tile. If the WPP is applied, the last coded palette table is not only initialized (reset) at the beginning of each slice or at the beginning of each tile, but also initialized (reset) at the beginning of each CTU row.

Palette Index Map Scan Order

Figure 1A:
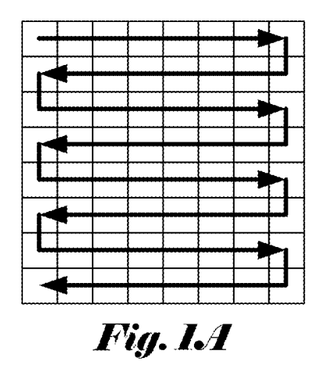
FIG. 1A illustrates a horizontal traverse scan for an 8×8 block according to a software test model based on high efficiency video coding (HEVC), where the scan for even rows is from left to right, and the scan for odd rows is from right to left.
Figure 1B:
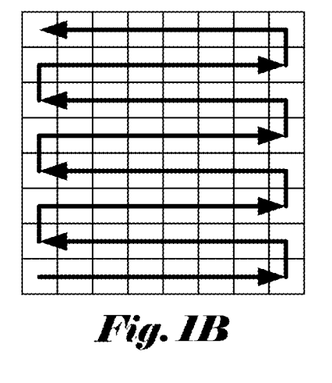
FIG. 1B illustrates a reversed horizontal traverse scan corresponding to the horizontal traverse scan in FIG. 1A.
Figure 1C:
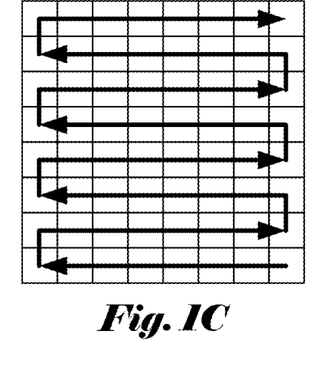
FIG. 1C illustrates a rotated (i.e., 180°) horizontal traverse scan corresponding to the horizontal traverse scan in FIG. 1A.

In SCM-3.0 palette mode coding, the traverse scan is used for index map coding as shown in FIG. 1A to FIG. 1C. FIG. 1A shows a horizontal traverse scan for an 8×8 block. In traverse scan, the scan for even rows is from left to right, and the scan for odd rows is from right to left. The traverse scan is applied for all block sizes in palette mode. FIG. 1B shows a reverse horizontal traverse scan for an 8×8 block. FIG. 1C shows a rotated (i.e., 180°) horizontal traverse scan for an 8×8 block respectively.

Palette Index Map Coding in SCM-4.0

In the palette mode coding according to SCM-4.0 (Joshi et al., *Screen content coding test model 4 (SCM 4)*, JCTVC-T1014, ITU-T SG16 WP3 and ISO/IEC JTC1/SC29/WG11, 20$^{th}$ Meeting: Geneva, CH, February 2015, Document: JCTVC-T1014), the palette indices are grouped and coded in front (i.e., before palette_run_mode and palette_run coding), and the escape pixels are coded at the end. The palette_run_mode and palette_run are coded between palette indices and escape pixels.

For palette run syntax, the binarization of associated symbols is divided into the most significant bit (MSB) index and the refinement bits of its value in a binary form. The MSB index for value 0 is assigned to −1. The resulting codeword is a concatenation of a prefix part and a suffix part. The prefix part represents the MSB index of a symbol value plus 1, denoted by msb_id_plus1, in a unary code or a truncated unary code if the maximal syntax value is known. msb_id_plus1 of a unsigned symbol x is given by $$\text{msb\_id\_plus1} = \begin{cases} \text{Floor}(\text{Log2}(x)) + 1 & \text{if } x > 0; \\ 0, & \text{otherwise} \end{cases}.$$

The suffix bin part represents the refinement bits and is present if msb_id_plus 1>1. The value of refinement bits, denoted by refinement_bits, is binarized by a fixed-length binary code with the string length equal to msb_id_plus1−1 or a truncated binary code if the maximal syntax value is known. The decoded syntax value x is given by $$x = \begin{cases} F(1 << (\text{msb\_id\_plus1} - 1)) + \text{refinement\_bits} & \text{if msb\_id\_plus1} > 1; \\ \text{msb\_id\_plus1}, & \text{otherwise} \end{cases}.$$

BRIEF SUMMARY OF THE INVENTION

A method of palette coding performed by a video encoder is disclosed. According to the first method, smaller blocks are derived from a larger block. The histogram of the larger block is derived based on the histograms of the smaller blocks by summing up the histograms of the smaller blocks. The histograms are used to derive the corresponding palette tables. Therefore, the computations required to derive the histograms can be reduced. The process can be repeated by further deriving the smaller blocks.

In the conventional approach, a palette table is derived for each block. In order to reduce the required computations, one palette table is derived based on multiple blocks jointly according to another method. This palette table will be used by each of the multiple blocks. Also, multiple palette tables can be derived for a group of blocks and a palette table is then selected from the multiple palette tables for each of the group of blocks.

According to yet another method, the additional buffer for storing the transpose flag and the operations required to perform the index map transpose are saved by storing the parsed palette indices in the palette buffer according to a transposed scan order if the transpose flag indicates the index map transpose. The process can be applied to horizontal or vertical directional scan.

According to still yet another method, the palette shuffling associated with the palette predictor update is performed using an index mapping table to avoid the need for physically relocating the contents of the palette predictor stored in a palette buffer. The index mapping table relates a palette index to a physical address of the palette buffer corresponding a palette colour. The index mapping table is maintained at an encoder side or a decoder side. The palette buffer can be implemented based on FIFO (first in and first out) registers.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Palette Histogram Sharing

For the palette mode, the palette colours for each coding unit (CU) are first generated. In order to derive the palette colours, the colour distribution in the coding unit is analysed and stored in a colour histogram first. Major colours are chosen from the histogram as the palette colours. In other words, the palette table can be derived based on the histogram of the corresponding coding unit. Palette colour index mapping and entropy coding are performed to signal the palette table. Computation of the colour histogram for each coding unit is very time-consuming in the palette process. Therefore, it is desirable to develop methods to speed up the colour histogram.

A method to speed up colour histogram computation is disclosed, where the colour histograms of small coding units are used to derive the colour histograms of larger coding units. For example, one 32×32 block can be divided into one 32×32 coding unit, four 16×16 coding units, sixteen 8×8 coding units, or the combination of 16×16 and 8×8 coding units. In other words, one 32×32 coding unit, four 16×16 coding units, sixteen 8×8 coding units, or the combination of 16×16 and 8×8 coding units can be derived from one 32×32 block. In the software test model for SCC (screen content coding) based on HEVC, a RDO (rate-distortion optimization) process is used to select a best coding mode among various block partitions. A total of 21 colour histograms need to be calculated and each pixel in this 32×32 block needs be accessed three times to get these 21 colour histograms.

According to one embodiment of the present invention, sixteen colour histograms for the sixteen 8×8 coding units are first derived respectively. These sixteen colour histograms are reused to derive four colour histograms for the four 16×16 coding units. Four colour histograms of the corresponding four 8×8 coding units in one 16×16 coding unit can be summed up to derived the larger colour histogram (i.e., 16×16). Similarly, the colour histogram of this 32×32 coding unit can be derived by summing up four colour histograms of the corresponding four 16×16 coding units in the 32×32 coding unit. Accordingly, each pixel in a 32×32 coding unit is only accessed once. Furthermore, accumulating the counts of pixel colours for the histograms only needs to be performed for the blocks with the smallest block size. Therefore, the required computations and memory access are substantially reduced.

Palette Table Sharing

In SCM-4.0, the encoder analyses the pixels in each CU and constructs a palette table accordingly. In other words, a palette table is derived for a CU individually. As mentioned above, the derivation of the palette table for each CU is quite computationally intensive. However, the palette tables of CUs may be similar. Accordingly, according to an embodiment of the present invention, a single palette table is derived based on multiple CUs. The derived single palette table is then used by each of the multiple CUs. Also multiple palette tables can be derived based on multiple CUs. Unlike the conventional palette table derivation, where each palette table is derived based on a corresponding CU individually, at least one palette table according to one embodiment of the present invention is derived based on multiple CUs jointly. One palette table can be selected from the multiple palette tables for each of the multiple CUs. Furthermore, the information of the previous palette tables associated with previous frames can be used to reduce the complexity of palette derivation. For example, the encoder may select one palette table for a current CU from one or more previous palette tables associated with the previous frames.

Performing the Index Map Transpose in the Parsing Stage

In SCM-4.0, the palette index map transpose is performed in the reconstruction stage. It requires an additional buffer to store the transpose flags after the transpose flags are parsed.

Furthermore, it also requires additional operations to transpose the index map. However, in the parsing stage, the palette indices are decoded sample by sample. In one embodiment of the present invention, the index map transpose is performed in the parsing stage. Accordingly, in the parsing stage, if the palette_transpose_flag is 1, the palette indices are stored in the buffer according to a transposed order. If the default scan order is horizontal raster/traverse scan, the index map will be stored in the vertical raster/traverse scan order if the palette_transpose_flag is 1. In this case, only the address generator needs to be modified. The reconstructed index map does not need to be transposed in the reconstruction stage.

Determining Horizontal or Vertical Scan According to SEI

In palette coding, two sample scan orders (i.e., the horizontal traverse scan and the vertical traverse scan) are used. In SCM-4.0, the encoder tests two scans and selects the best scan by the RDO process. An embodiment of the present invention uses additional information to select the best scan order instead of trying both scans. For example, the selection may be based on SEI (supplemental enhancement information) signalled in the video bitstream. The SEI information, such as the measurement values by a gyro-scope and accelerometer, phone position, and the text language can be used to help the scan selection. For example, if the phone is rotated by 90 degree, the vertical scan can be applied.

Using Index Mapping to Avoid Palette Shuffling

Figure 2:
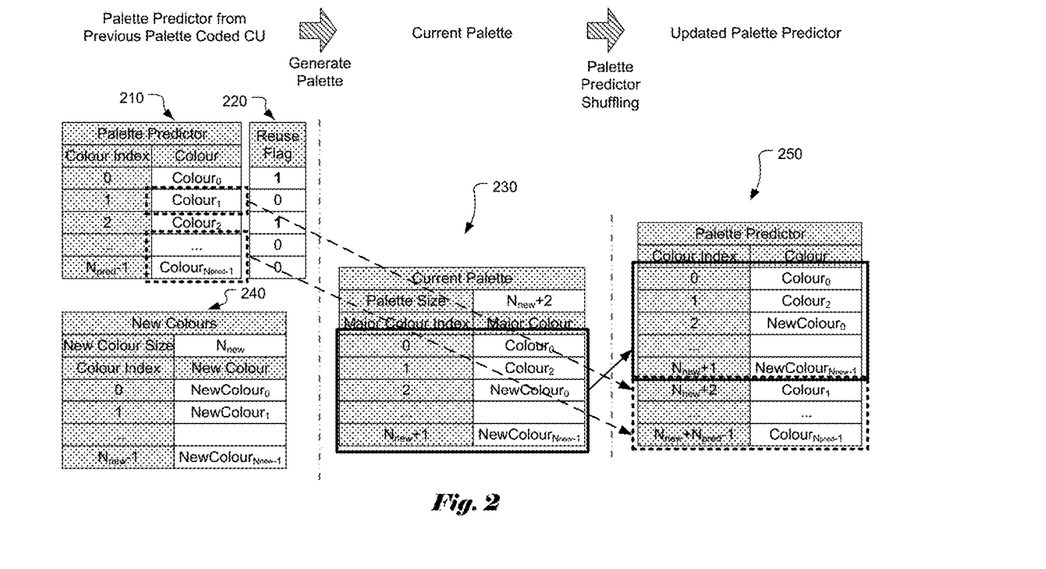
FIG. 2 illustrates an example of palette predictor update process, where the contents of the palette predictor stored in a buffer are re-ordered.

In SCM-4.0, the next palette predictor is generated from the current palette predictor and the current palette table. In turn, the current palette predictor is generated using information of the previous palette. The palette predictor stored in a palette buffer needs to be updated after the current CU is palette coded. The palette predictor update involves moving the contents around to reflect the palette predictor update process. FIG. 2 illustrates an example of palette predictor update process. The current palette prediction 210 comprises colour indices and associated colours. Furthermore, there is a reuse flag field 220 associated with the palette predictor to indicate whether a colour of the predictor is used by the current palette table 230. In this example, only two colours in the predictor are used by the current CU (i.e., colour$_0$ and colour$_2$). There are N$_{new}$ new colours (240) in the current CU. To update the palette predictor, the colours in the buffer need to be reordered to generate the updated palette predictor 250. This operation is complex. An embodiment of the present invention uses an index mapping method to avoid shuffling colours in the buffer. The encoder/decoder can maintain a mapping table between the palette index and the colour (i.e., address) in the physical buffer (also named palette buffer) to store the palette prediction. The palette buffer can be implemented based on FIFO (first in and first out) registers. To perform palette predictor shuffling, the encoder or decoder only needs to modify the mapping table between the palette index and colour in the buffer without physically moving the colours around in the palette buffer.

Reuse of Residual Buffer for Palette Information in the Parsing Stage for the Palette Mode In HEVC coefficient parsing, the decoded coefficients of a TU are stored in a coefficient buffer. In SCC coding, there is no residual coding for the palette mode. Therefore, the coefficient buffer can be used to store the palette index map information, which includes palette run type, palette index, palette run, and escape values.

In one embodiment, the parsed palette indices of samples are reconstructed in parsing stage. The coefficient buffer is used to store the reconstructed palette indices and escape values.

In another embodiment, the parsed palette indices of each sample are reconstructed in parsing stage and the reconstruction values of different colour component are also reconstructed by palette table look up in parsing stage. Therefore, the coefficient buffer is used to store the reconstructed pixel values and escape values, or is used to store the reconstructed pixel values, escape values, and escape flags. According to this method, the palette table only needs to be stored in the parsing stage. In the reconstruction stage, the palette table does not need to be stored and maintained. In one example, the buffer area for the MSB is used to store the escape flag. The rest bits are used to store the reconstructed pixel value or escape value. In the reconstruction stage, the escape flag stored in the MSB buffer area can be used to reconstruct the escape values or the reconstructed pixel value or escape value stored in the rest bits area of the coefficient buffer can be directly used to reconstruct the escape values.

In another embodiment, the parsed palette indices of samples are reconstructed in the parsing stage and the reconstruction values of different colour component are also reconstructed using palette table lookup in the parsing stage. The pixel values of the escape sample are also reconstructed by the escape values in the parsing stage. Therefore, the coefficient buffer is used to store the reconstructed pixel values. According to this method, the palette table only needs to be stored in the parsing stage. In the reconstruction stage, the palette table does not need to be stored and maintained.

Figure 3:
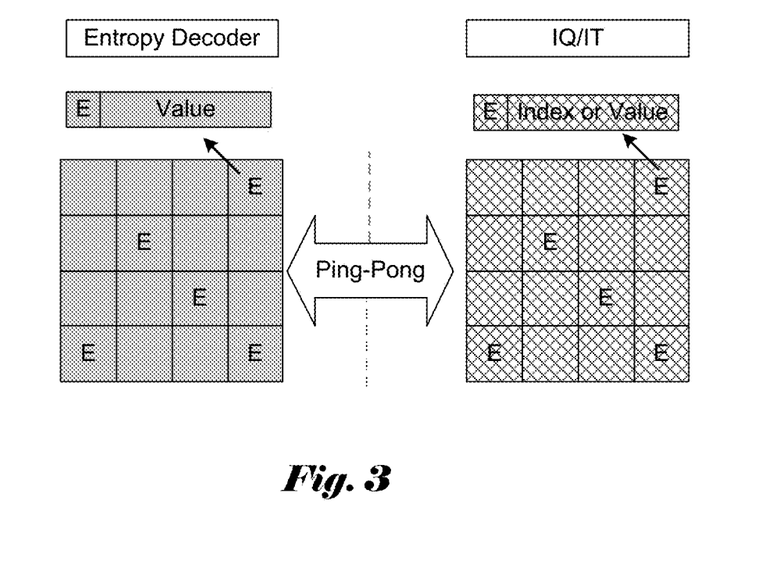
FIG. 3 illustrates an example of coefficient buffer reuse for the case of 4×4 blocks, where each small square represents one pixel and the label "E" indicates an escape pixel.

In SCM-5.1 (Joshi et al., *Screen content coding test model 5 (SCM 5)*, JCTVC-T1014, ITU-T SG16 WP3 and ISO/IEC JTC1/SC29/WG11, 21st Meeting: Warsaw, PL, 19-26 Jun. 2015, Document: JCTVC-U1014), the escape pixels are parsed colour plane by colour plane. The escape values of the first colour component are parsed together. Then the escape values of the second and third colour components are parsed respectively. The coefficient buffer can be used to store the palette index map information, which includes palette run type, palette index, palette run, and escape values. However, if there is only one coefficient buffer in the parsing stage and the ping-pong buffer is used for the pipeline buffer, it might need a CU_width*CU_height*1-bit buffer to store the escape pixel position. FIG. 3 illustrates an example of coefficient buffer reuse for the case of 4×4 blocks, where each small square represents one pixel and the label "E" indicates an escape pixel. For each escape pixel, a pixel value has to be sent. For a 32×32 block, a 32×32×1 bit buffer will be required. With this position buffer, when the index, pixel values, and escape values of the first colour component are passed to the next pipeline stage, the escape values of the second and third colour components can be filled into the correct position. In this method, the palette indices are only stored in the first colour component buffer. For the first colour component, the buffer area for the MSB is used to store the escape flag. With this flag, the palette indices stored in the first colour component buffer can be filled into second and third colour component buffer in cross-colour prediction (CCP) stage/module or adaptive colour transform (ACT) stage/module. According to another embodiment, when reconstructing the pixel values in the second and third colour components, the decoder can load the data into the first colour component buffer to get the palette indices.

Figure 4:
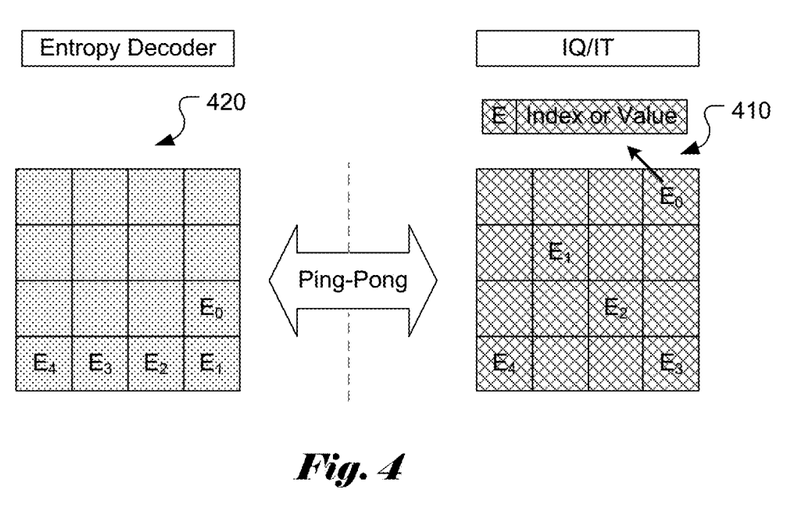
FIG. 4 illustrates an example of coefficient buffer reuse for the case of 4×4 blocks, where the escape values are located at the end of the buffer.

According to another embodiment, the escape values of the second and the third color components are stored at the end of the buffer, as shown in FIG. 4, where buffer 410 stores the first colour component and buffer 420 stores the second and third colour components. During the parsing stage for the first colour component, the locations of escape pixels are known. Therefore, the escape pixels can be stored at corresponding locations as indicated by "E" in buffer 410. For the second and third color components, they are stored in buffer 420 starting from the end of the buffer. The order can follows the palette scan order. According to another embodiment, the CU_width*CU_height*1-bit buffer is not required. The palette indices are only stored in the first color component buffer. For the first color component, the buffer area for the MSB is used to store the escape flag. With this flag, the palette indices stored in first color component buffer can be filled into second and third color component buffers in the cross-color prediction (CCP) stage/module or the adaptive color transform (ACT) stage/module. Also, the escape values stored at the end of the second and the third color component buffers can be put into the correct position. For example, in the first color component, if the upper-right pixel is an escape pixel ($E_0$), the $E_0$ pixels in the second and third color component buffers (the last position in the third row) are loaded into the upper-right pixels. According to yet another embodiment, when reconstructing the pixel values in the second and third color components, the decoder can load the data into the first color component buffer to get the palette indices.

In still yet another embodiment, if a ping-pong pipeline buffer is not used, the data in the entropy decoder stage buffer can be read and written to the IT/IQ (inverse transform/inverse quantisation) stage buffer. In this embodiment, in order to keep the escape pixel position in the coefficient buffer, the buffer area for the MSB is used to store the escape flag. When parsing the second and the third color component data, the escape flags are not reset. Only the rest bits can be changed. In this way, the decoder can know the escape pixel position in the second and the third color component.

Figure 5:
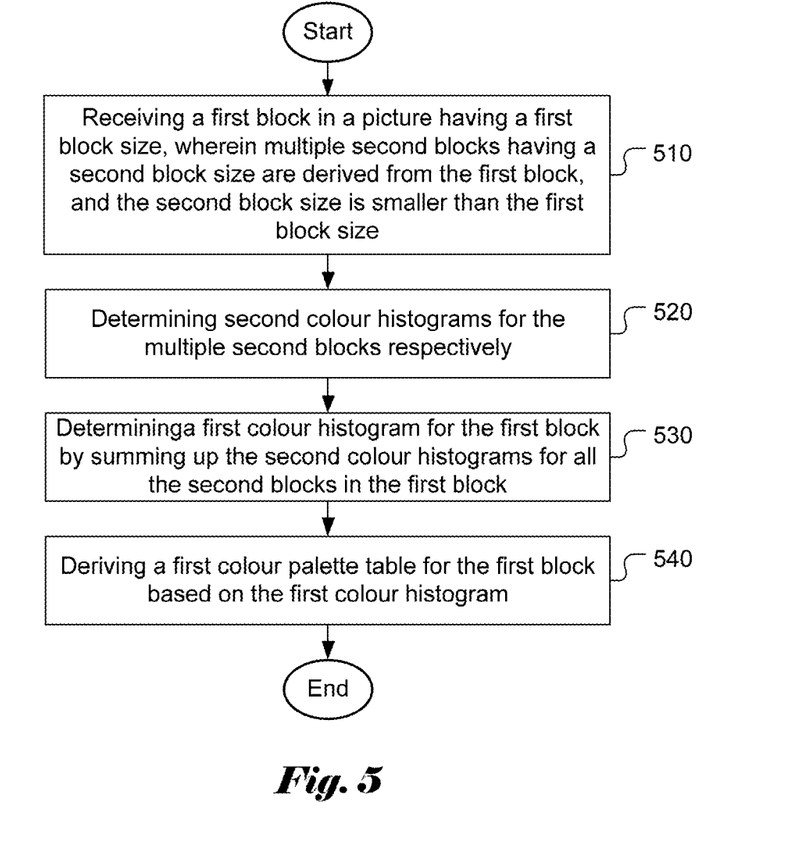
FIG. 5 illustrates a flowchart of an exemplary video encoder using palette coding modes according to an embodiment of the present invention, where the histogram of a larger block is derived based on the histograms of smaller blocks in the larger block.

FIG. 5 illustrates a flowchart of an exemplary video encoder using palette coding modes according to an embodiment of the present invention. A first block in a picture having a first block size is received in step 510, wherein multiple second blocks having a second block size are derived from the first block, and the second block size is smaller than the first block size. Second colour histograms are determined for the multiple second blocks respectively in step 520. A first colour histogram is determined for the first block by summing up the second colour histograms for all the second blocks in the first block in step 530. A first colour palette table for the first block is derived based on the first colour histogram in step 540.

Figure 6:
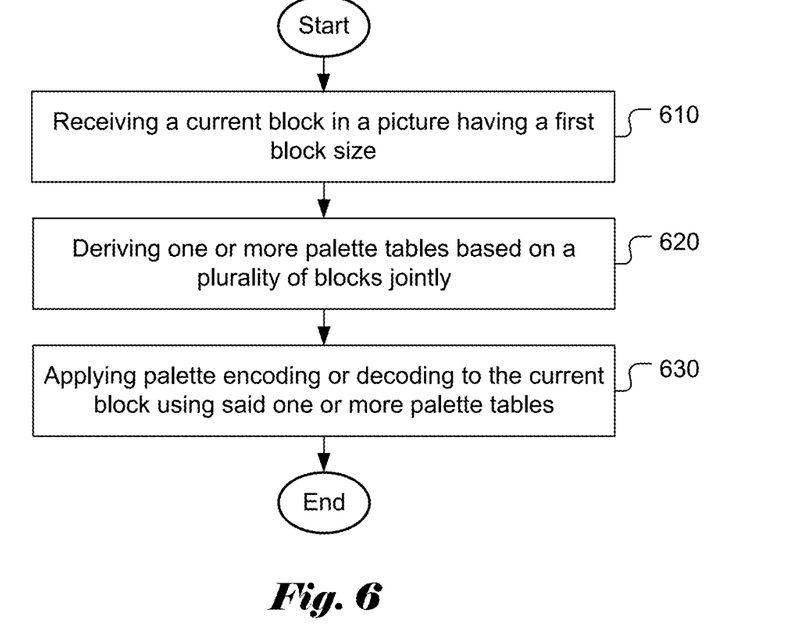
FIG. 6 illustrates a flowchart of an exemplary video encoder or decoder using palette coding modes according to an embodiment of the present invention, where one or more palette tables are derived based on multiple blocks jointly.

FIG. 6 illustrates a flowchart of an exemplary video encoder or decoder using palette coding modes according to an embodiment of the present invention. current block in a picture having a first block size is received in step 610. One or more palette tables derived based on a plurality of blocks jointly in step 620. Palette encoding or decoding is then applied to the current block using said one or more palette tables in step 630.

Figure 7:
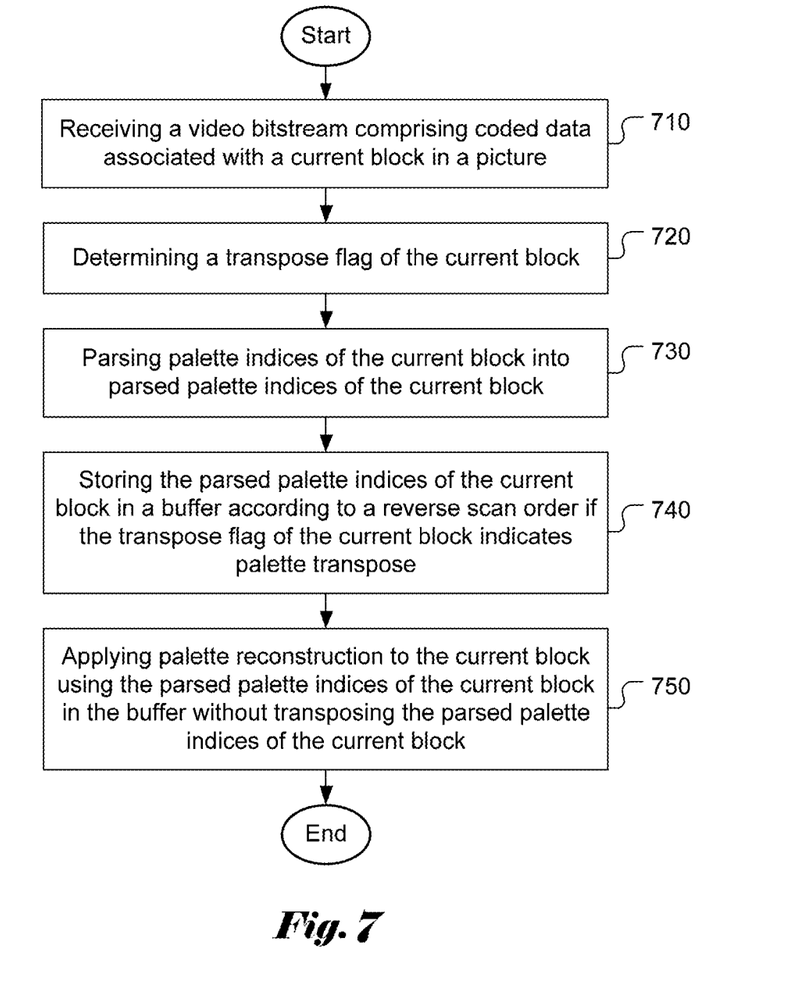
FIG. 7 illustrates a flowchart of an exemplary video decoder using palette coding modes according to an embodiment of the present invention, where index map transpose is performed in the parsing stage.

FIG. 7 illustrates a flowchart of an exemplary video decoder using palette coding modes according to an embodiment of the present invention. A video bitstream comprising coded data associated with a current block in a picture is received in step 710. A transpose flag of the current block is determined in step 720. Palette indices of the current block are parsed into parsed palette indices of the current block in step 730. The parsed palette indices of the current block are stored in a buffer according to a reverse scan order in step 740 if the transpose flag of the current block indicates palette transpose. Palette reconstruction is applied to the current block using the parsed palette indices of the current block in the buffer without transposing the parsed palette indices of the current block in step 750.

Figure 8:
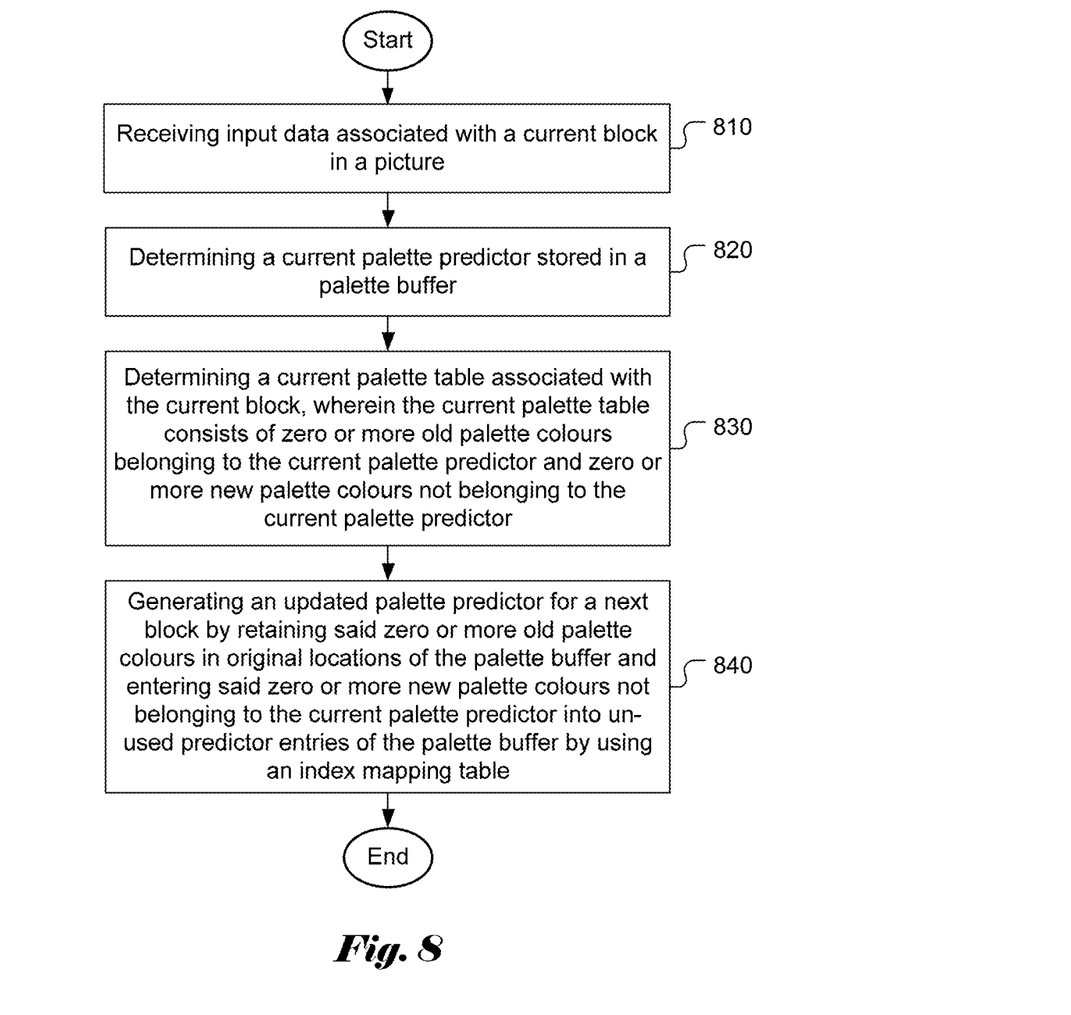
FIG. 8 illustrates a flowchart of an exemplary video encoder or decoder using palette coding modes according to an embodiment of the present invention, where the palette predictor update.

FIG. 8 illustrates a flowchart of an exemplary video encoder or decoder using palette coding modes according to an embodiment of the present invention. Input data associated with a current block in a picture is received in step 810. A current palette predictor stored in a palette buffer is determined in step 820. A current palette table associated with the current block is determined in step 830, where the current palette table consists of zero or more old palette colours belonging to the current palette predictor and zero or more new palette colours not belonging to the current palette predictor. An updated palette predictor for a next block is generated in step 840 by retaining said zero or more old palette colours in original locations of the palette buffer and entering said zero or more new palette colours not belonging to the current palette predictor into un-used predictor entries of the palette buffer by using an index mapping table.

The flowcharts shown are intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of palette coding performed by a video encoder, the method comprising:
   identifying a first block in a picture and identifying second blocks in the picture that correspond to portions of the first block;
   determining, by processing circuitry of the video encoder, second colour histograms for the second blocks, respectively;
   determining, by the processing circuitry of the video encoder, a first colour histogram for the first block by summing up the determined second colour histograms;
   deriving, by the processing circuitry of the video encoder, a first colour palette table for the first block based on the first colour histogram;
   determining, by the processing circuitry of the video encoder using at least the first colour palette table, a partitioning structure for encoding the first block; and
   encoding the first block by applying the determined partitioning structure.

2. The method of claim 1, further comprising:
   identifying third blocks in the picture that correspond to portions of at least one of the second blocks; and
   determining third colour histograms for the third blocks, respectively,
   wherein one of the second colour histograms for the at least one of the second blocks is determined by summing up the corresponding third colour histograms.

3. The method of claim 2, further comprising:
   deriving second colour palette tables for the respective second blocks based on the second colour histograms; and
   deriving third colour palette tables for the respective third blocks based on the third colour histograms.

4. The method of claim 1, further comprising deriving second colour palette tables for the second blocks, respectively, based on the second colour histograms.

5. A method of palette decoding performed by a video decoder, the method comprising:
   receiving a video bitstream comprising coded data associated with a current block in a picture;
   determining a transpose flag of the current block;
   parsing palette indices of the current block into parsed palette indices of the current block;
   storing the parsed palette indices of the current block in a buffer according to a reverse scan order responsive to the transpose flag of the current block indicates indicating a palette transpose; and
   applying palette reconstruction to the current block based on the palette transpose using the parsed palette indices of the current block in the buffer without transposing the parsed palette indices of the current block.

6. The method of claim 5, wherein if a default scan direction is horizontal or horizontal transverse scan, the parsed palette indices of the current block are stored in the buffer according to a vertical or vertical transverse scan order if the transpose flag of the current block indicates palette transpose.

7. The method of claim 5, wherein if a default scan direction is vertical or vertical transverse scan, the parsed palette indices of the current block are stored in the buffer according to a horizontal or horizontal transverse scan order if the transpose flag of the current block indicates palette transpose.

8. A method of palette coding performed by a video encoder or decoder, the method comprising:
   receiving input data associated with a current block in a picture;
   determining a current palette predictor stored in a palette buffer;
   determining a current palette table associated with the current block, wherein the current palette table consists of one or more old palette colours belonging to the current palette predictor and one or more new palette colours not belonging to the current palette predictor; and
   generating an updated palette predictor for a next block by retaining said one or more old palette colours in original locations of the palette buffer and entering said one or more new palette colours not belonging to the current palette predictor into un-used predictor entries of the palette buffer by using an index mapping table.

9. The method of claim 8, wherein the index mapping table relates a palette index to a physical address of the palette buffer corresponding a palette colour.

10. The method of claim 8, wherein the index mapping table is maintained at an encoder side or a decoder side.

11. The method of claim 8, further comprising updating the index mapping table according to the updated palette predictor.

12. The method of claim 8, wherein the palette buffer is implemented based on FIFO (first in and first out) registers.

* * * * *